No. 612,117. Patented Oct. 11, 1898.
J. A. MEHLING.
VEHICLE.
(Application filed July 23, 1897.)

(No Model.)

Witnesses
Frank R. Maury
C. F. Voltzian

Inventor
John A. Mehling
by Wm H. Monroe
Attorney

UNITED STATES PATENT OFFICE.

JOHN A. MEHLING, OF CLEVELAND, OHIO, ASSIGNOR TO FRANK B. MANNY, OF SAME PLACE.

VEHICLE.

SPECIFICATION forming part of Letters Patent No. 612,117, dated October 11, 1898.

Application filed July 23, 1897. Serial No. 645,667. (No model.)

*To all whom it may concern:*

Be it known that I, JOHN A. MEHLING, a citizen of the United States, and a resident of Cleveland, county of Cuyahoga, State of Ohio, have invented certain new and useful Improvements in Vehicles, of which I hereby declare the following to be a full, clear, and exact description, such as will enable others skilled in the art to which it appertains to make and use the same.

My invention relates to improvements in road-vehicles, and is designed to afford to passengers the combined advantages of an open observation-vehicle and closed vehicle, while also arranged to afford the most convenient and ready access to and from the seats.

My invention further consists in the combination and arrangement of the various parts and construction of details, as hereinafter described, shown in the accompanying drawings, and specifically pointed out in the claims.

Figure 1:
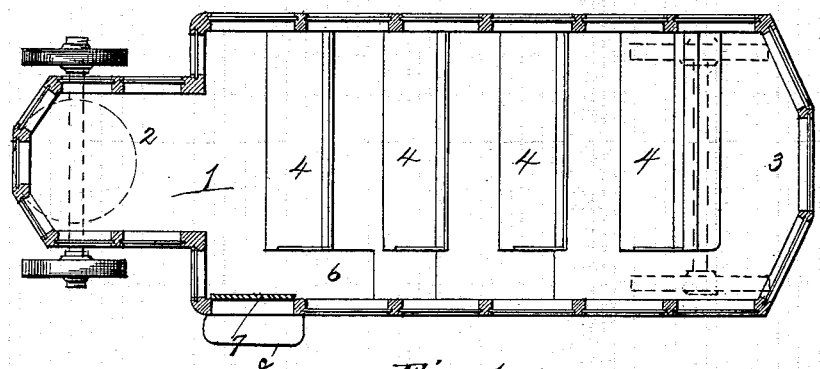
Figure 2:
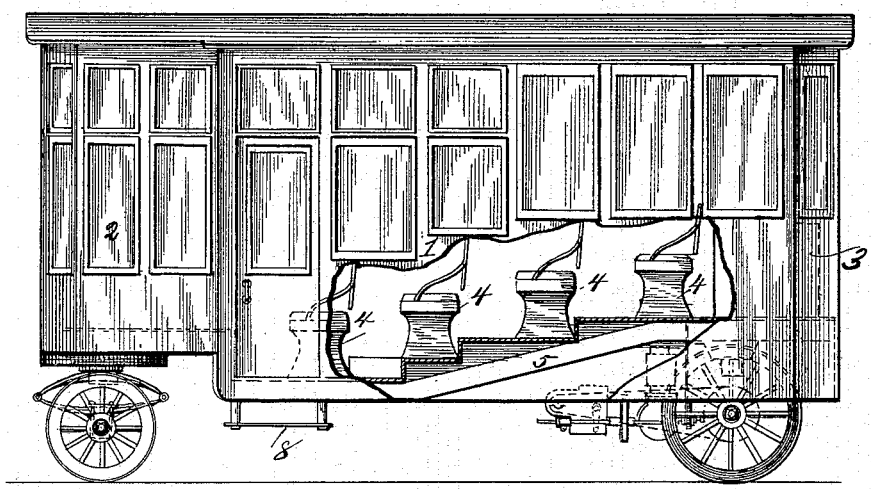

In the accompanying drawings, Figure 1 is a plan view of vehicle, taken on horizontal section-line *a a*, Fig. 2. Fig. 2 is a side elevation of the same, partially broken away to show the rising floor and elevated seats.

In the views, 1 is the body of the vehicle; 2, the front vestibule; 3, the rear vestibule; 4, the seats, transversely arranged upon steps on the floor-supports 5, which rise from front toward the rear, thus giving an opportunity for the passengers on the rear seats to have an unobstructed view over the heads of those in front.

An aisle 6 extends from front to rear of the vehicle, or approximately so, and is formed on one side by one end of the seats and on the other side by the side wall of the vehicle-body, no partition or dividing-wall being interposed. This side of the vehicle is provided with one or more entrance-doors 7, opening directly into the aisle, and a foot-board 8 is placed on that side of the vehicle to give access to the door or doors.

The sides, front, and rear of the vehicle are well lighted by windows to give a clear view in all directions.

The space inclosed by the vestibules can be utilized as standing-room for passengers.

I claim—

1. A vehicle provided with transversely-arranged seats, an aisle extending practically or approximately the entire length of the vehicle-body, the said aisle being formed by the one end of the seats on one side and the side wall of the vehicle-body on the other side, without the interposition of a partition or dividing-wall, and the floor and seats therein rising from the front to the rear of the vehicle, in combination with one or more doors entering the aisle-wall of the vehicle on the same side as the aisle, and a foot-board on that side substantially as described.

2. A vehicle having transversely-arranged seats, an aisle at one side, inclosed within the vehicle-body and extending practically or approximately the entire length of the body, one or more doors leading into the said aisle through the side wall, the aisle being formed by the one end of the seats on one side, and the side wall of the vehicle-body on the other side, without the interposition of a partition or dividing-wall, and the floor and seats therein rising from the front to the rear of the vehicle, substantially as described.

3. A closed vehicle-body provided with a rising floor from the front to the rear, lighted vestibules at either extremity of the body, and lighted walls on either side, in combination with an entrance-door opening through one side wall at the lower extremity of the floor and a foot-board on the same side as the door, substantially as described.

JOHN A. MEHLING.

Witnesses:
WM. M. MONROE,
FRANK B. MANY.